United States Patent [19]

Paisley

[11] Patent Number: 4,607,730

[45] Date of Patent: Aug. 26, 1986

[54] BRAKE MECHANISM

[75] Inventor: Daniel J. Paisley, Dubuque, Iowa

[73] Assignee: Deere & Company, Moline, Ill.

[21] Appl. No.: 559,662

[22] Filed: Dec. 9, 1983

[51] Int. Cl.⁴ .............................................. F16D 65/24
[52] U.S. Cl. ................................. 188/170; 92/130 A;
  188/71.5; 188/72.1; 188/369; 192/70.27;
  192/91 R
[58] Field of Search ..................... 188/71.4, 71.5, 72.6,
  188/170, 369, 106 F, 72.1; 92/130 A; 192/91 R,
  91 A, 70.27

[56] References Cited

U.S. PATENT DOCUMENTS

| 2,252,906 | 8/1941 | Williamson | 188/724 X |
| 3,306,401 | 2/1967 | Dasse | 188/251 |
| 3,525,421 | 8/1970 | Sickle et al. | 188/71.5 |
| 3,559,772 | 2/1971 | Grombka | 188/170 |
| 3,791,492 | 2/1974 | Neilsen | 188/170 |
| 3,863,038 | 1/1975 | Kreitner et al. | 188/170 |
| 4,018,140 | 4/1977 | Engle | 92/31 |
| 4,245,724 | 1/1981 | Beck | 192/91 A X |
| 4,263,991 | 4/1981 | Morgan et al. | 188/170 |

FOREIGN PATENT DOCUMENTS 934142  8/1963  United Kingdom ............... 188/170

Primary Examiner—George E. A. Halvosa

[57] ABSTRACT

A park brake mechanism includes a sealed housing enclosing a brake disc pack which is normally pressed together by a plurality of coil compression springs acting between an end of the housing and a pressure plate. Four hydraulic pistons are reciprocably mounted in the opposite end of the housing and connecting pins are received between the pistons and the pressure plate and serve to effect the release of the braking action between the disc pack discs when the pistons are pressurized. The pistons are in a rectangular pattern and diagonally opposite ones have threaded ports aligned therewith and adapted for receiving screws for stroking the pistons in the absence of pressure. A fluid pressure passage leading to the pistons contains a one-way orifice which operates to modulate the application of the brakes when pressure is relieved from the pistons.

1 Claim, 4 Drawing Figures

BRAKE MECHANISM

BACKGROUND OF THE INVENTION

The present invention relates to a vehicle brake mechanism and more particularly relates to a mechanism having spring-applied, hydraulically-released braking members.

Spring-applied, hydraulically-released braking members are often employed in brake mechanisms intended for use as vehicle park brakes. Heretofore, these mechanisms have suffered from one or more of the following disadvantages:

1. Their braking capacity is not sufficient to prevent the vehicle from being driven with the brake engaged thus leading to undue wear and failure of the brake components. Also, the heat generated in the brake mechanism by such driving presents a fire hazard.
2. The brake members are adversely affected by contact with brake fluid.
3. Emergency braking is too abrupt.
4. Large sealing surfaces are used making the keeping of tolerances difficult.
5. Hydraulic fluid is pressurized by a manually operated pump to release the brake, for permitting towing and the like, in the event of a failure of the primary pressure source and thus complicates the system and makes it less reliable.

SUMMARY OF THE INVENTION

According to the present invention there is provided an improved brake mechanism including spring-applied, hydraulically-released braking members.

An object of the invention is to provide a braking mechanism of the above-noted type which lacks all of the disadvantages listed above.

More specifically, it is an object of the invention to provide a braking mechanism having a sealed housing which contains disc-type braking members intended for operating in oil, a plurality of small hydraulically operable pistons for effecting disengagement of the members and a plurality of small springs for effecting engagement of the members.

Further, it is an object to provide manually-operable screws for acting through at least two of the pistons for effecting release of the braking members in the absence of fluid pressure, these screws normally serving together with like screws for securing the brake member housing to the brake piston housing.

Yet another object is to provide a one-way orifice in a fluid supply passage leading to the pistons which operates to prevent abrupt engagement of the brake members when the fluid pressure acting on the pistons is removed.

These and other objects will become apparent from a reading of the ensuing description together with the appended drawings.

DESCRIPTION OF THE PREFERRED EMBODIMENT

Preliminarily, it is to be noted that the brake mechanism described below is described as being associated with the input shaft of a tractor differential, and the description of some of the components reflects this association. However, it is to be understood that the brake mechanism could be associated with any appropriate shaft in a vehicle drive line without departing from the principles of the invention.

Figure 1:
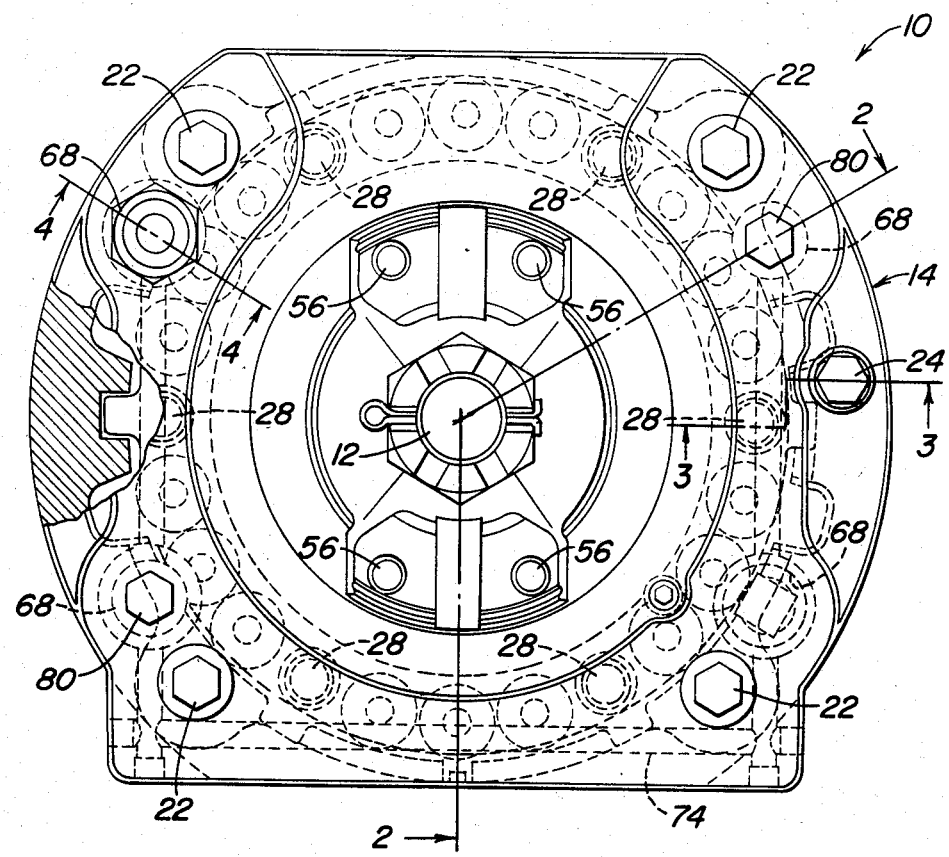
FIG. 1 is a side elevational view of a brake mechanism constructed in accordance with the present invention and shown mounted on a shaft to be braked.
Figure 2:
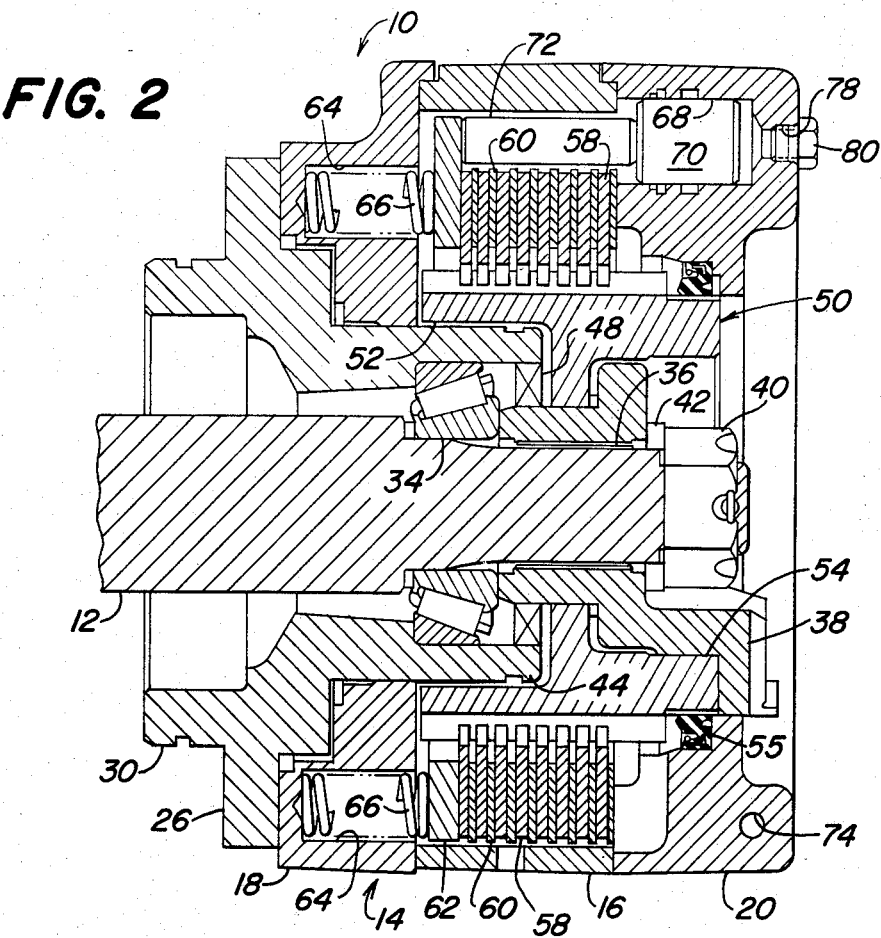
FIG. 2 is a sectional view taken along line 2—2 of FIG. 1.
Figure 3:
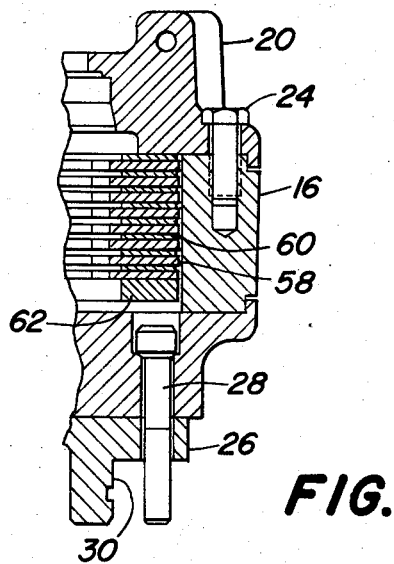
FIG. 3 is a sectional view taken along line 3—3 of FIG. 1.

Referring now to FIGS. 1 and 2, there is shown a brake mechanism 10 mounted on a differential input shaft 12 for selectively braking the latter. The mechanism 10 includes a housing assembly 14 comprising a brake disc pack housing 16 sandwiched between a spring housing 18 and a piston housing 20. The housing assembly 14 is sealed in a manner described below, so that lubrication may be provided to lessen heat generation during braking, corrosion to housed elements and the presence of contaminants in the housing. The housings 16, 18, and 20 are held together in final assembly by four cap screws 22 and the housings 16 and 20 are held together in subassembly by two cap screws 24 (only one shown). Provided for supporting the housing assembly from a rear axle assembly is an annular member having the spring housing 18 mounted thereon and secured thereto by means of six socket head screws 28 which are adapted for reception in holes provided in a differential case or the like (not shown). When the annular member 26 is properly mounted, a seal surface 30 at the end thereof is received in a circular opening in the differential case.

The differential input shaft 12 is rotatably supported in the member 26 by a tapered roller bearing 34. The shaft 12 has a splined section 36 adjacent the bearing 34 and received on the splines is a shaft-connection yoke 38. A nut 40 on the end of the shaft 12 presses a washer 42 against the yoke 38 which in turn engages the bearing 34. The annular member 26 includes an end portion 44 which extends beyond the bearing 34 and about an end portion 46 of the yoke 38. A differential seal 48 is mounted between these end portions. An annular friction element hub 50 is located primarily within the brake disc pack housing 16 and includes an end portion 52 received over the end portion 44 of the annular member 26 and includes an opposite end portion 54 received about the yoke 38 and within the housing 20. A special seal 55 is located between the end portion 54 and the housing 20. Four cap screws 56 secure the yoke to the hub 50 so that the yoke and hub rotate together with the shaft.

Mounted about the hub 50 is a brake disc pack including a plurality of friction discs 58 interleaved with a plurality of separator discs 60, the friction discs being splined to the hub 50 and the separator discs being splined to the disc pack housing 16. Located adjacent the spring housing 18 at one end of the disc pack is a pressure plate 62. A plurality of spring receptacles 64 are arranged in a circular pattern in the housing 18, and located in at least some of the receptacles are coil compression springs 66 which normally press the plate 62 so as to effect braking engagement between the friction and separator discs 58 and 60, respectively. The number of springs 66 actually used will depend upon the braking force desired for a given vehicle application.

Figure 4:
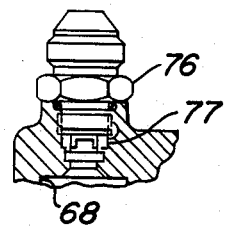
FIG. 4 is a sectional view taken along line 4—4 of FIG. 1.

Arranged in a somewhat rectangular pattern in the piston housing 20 are four cylindrical bores 68 in which are respectively received hydraulic pistons 70. Arranged in alignment with the pistons 70 are connecting pins 72 which extend to the pressure plate 62. Thus, when the pistons 70 are pressurized, they press the pins 72 against the pressure plate 62 in opposition to the springs 66. A drilled passage 74 is located in the piston housing 20 and interconnects the bores 68. As can best be seen in FIG. 4, a fitting 76 is located in the piston housing 20 in axial alignment with one of the bores 68 and leads to the passage 74. Located in the fitting is a oneway orifice 77 which operates to modulate the application of the brakes when fluid pressure is relieved from the passage either through operation of a manual valve (not shown), as would be the normal case, or as a result of some failure in the brake fluid supply system.

Ports 78 are provided in the housing 20 in axial alignment with a diagonally opposite pair of the bores 68 and received in the ports are plugs 80. In the event that it is necessary to release the brakes after a failure in brake fluid pressure has occurred, this may be done manually by removing the plugs 80 and inserting screws in the ports 78 for stroking the associated pair of diagonally opposite pistons 70. It is to be noted that the ports 78 may be sized appropriately for receiving the pair of the cap screws 24 Thus, an operator will always have the screws he needs to release the brakes in the event of an emergency.

The operation of the brake mechanism 10 is thought to be clear from the foregoing description and for the sake of brevity is not reiterated here. Suffice it to say that the park brake mechanism described herein provides reliable braking when a vehicle is parked and also provides reliable, modulated secondary braking in the event that the service brakes fail while the vehicle is in motion.

I claim:

1. A park brake mechanism arranged for selectively applying a braking force to a drive shaft, comprising: a fixed housing assembly disposed annularly about an end of said drive shaft; one end of said housing assembly having four cylindrical bores arranged in a generally rectangular configuration and opening axially toward an opposite end of the housing assembly; a fluid passage interconnecting the bores; a piston received in each bore; a threaded port leading axially into a diagonally disposed pair of the bores; screw means for selected threaded reception in each of said ports for stroking an associated piston; a disc pack located in the housing assembly and including first disc members fixed to the housing assembly and second disc members interleaved with the first disc members and fixed for rotation with the shaft; a pressure plate axially, shiftably mounted in the housing assembly adjacent a first end of the disc pack which is remote from the pistons; connecting pins respectively mounted with opposite ends engaging said pistons and the pressure plate; a plurality of coil compression springs mounted between said opposite end of said housing assembly and said pressure plate for effecting engagement of the brake in the absence of fluid pressure acting on the pistons; said housing assembly including a disc pack housing sandwiched between and separable from a spring housing and a piston housing, with the spring and piston housings defining said one and opposite ends of said housing assembly; releasable securing means including a first set of fasteners for securing only the disc pack and piston housings together in a subassembly and a second set of fasteners for fixing the spring and piston housings to the disc pack housing in full assembly; and said first set of fasteners including said screw means whereby said screw means is always readily available for stroking said pistons.

* * * * *